United States Patent [19]

Ganley et al.

[11] Patent Number: 5,875,230
[45] Date of Patent: Feb. 23, 1999

[54] INTERACTIVE MEASUREMENT SYSTEM AND METHOD FOR TELECOMMUNICATION NETWORKS

[75] Inventors: John Thomas Ganley, Milford; Abubaker I. Habib, Freehold; Allen J. Mollica, Middlesex; David Beaumont Ramsden, Wall, all of N.J.

[73] Assignee: AT&T Corp., Middletown, N.J.

[21] Appl. No.: 771,729

[22] Filed: Dec. 20, 1996

[51] Int. Cl.⁶ .............................. H04M 1/24; H04M 3/08; H04M 3/22

[52] U.S. Cl. ................... 379/29; 379/1; 379/22; 324/600; 324/614

[58] Field of Search .................. 379/24, 1, 3, 5, 379/9, 12, 22, 23, 27, 29, 19, 21, 406, 410, 26, 6, 10; 370/242, 247, 249; 324/600, 614, 654

[56] References Cited

U.S. PATENT DOCUMENTS

| | | | |
|---|---|---|---|
| 4,352,182 | 9/1982 | Billi et al. | 379/2 |
| 4,464,543 | 8/1984 | Kline et al. | 340/286 |
| 4,764,949 | 8/1988 | Faith et al. | 379/9 |
| 5,239,574 | 8/1993 | Brandman et al. | 379/88 |
| 5,327,489 | 7/1994 | Anderson et al. | 379/207 |
| 5,353,327 | 10/1994 | Adari et al. | 379/22 |
| 5,384,822 | 1/1995 | Brown et al. | 379/10 |
| 5,463,670 | 10/1995 | Chiang et al. | 379/27 |
| 5,465,287 | 11/1995 | Egozi | 379/5 |
| 5,479,473 | 12/1995 | Zey | 379/10 |
| 5,519,774 | 5/1996 | Battista et al. | 379/386 |
| 5,596,623 | 1/1997 | Uchiba et al. | 379/15 |
| 5,606,592 | 2/1997 | Galloway et al. | 379/30 |
| 5,625,667 | 4/1997 | Vogt, III et al. | 379/30 |
| 5,636,260 | 6/1997 | Chopping | 379/5 |
| 5,784,406 | 7/1998 | Dejaco et al. | 379/5 |
| 5,793,864 | 8/1998 | Ramsden | 379/24 |

*Primary Examiner*—Curtis A. Kuntz
*Assistant Examiner*—Rexford N. Barnie

[57] ABSTRACT

A measurement system and method for a telecommunication systems diagnoses problems within a communication line. The measurements are performed both non-intrusively and intrusively in an interactive manner, and evaluate the transmission quality of the communication line through to the subscriber's telephone set.

24 Claims, 1 Drawing Sheet

INTERACTIVE MEASUREMENT SYSTEM AND METHOD FOR TELECOMMUNICATION NETWORKS

FIELD OF THE INVENTION

The present invention relates to measurements of a communication line within a telecommunication network to diagnose problems. Specifically, the present invention relates to a combination of non-intrusive and intrusive interactive measurement techniques to evaluate the transmission quality of the communication line through to the subscriber's telephone set.

BACKGROUND

To diagnose potential problems with a communication line within a telecommunication network, several measurements techniques have been utilized. At the most basic level, the metallic loop test (MLT) is a measurement technique that has been used to test a direct current (dc) component of the connection between the subscriber and an end-office, commonly known as the loop connection. MLT determines whether a short circuit exists in the communication line that would prevent transmission, but cannot evaluate the transmission quality of an operating communication line.

To assess the transmission quality of a communication line, other measurement techniques have been developed. For example, one technique is to take a segment of the communication network, for example the communication path between two toll switches, off-line/out-of-service and then perform measurements on that particular segment. This process is then repeated for other segments of the communication network to isolate the origin of the problem. Such a measurement technique, however, presents several problems. First, substantial costs result from taking segments of the communication network off-line to perform testing. Second, every segment of the communication network may not be owned by the same commercial entity. In such a case, performing and coordinating a test of the communication path from the call origin to the call destination may not be feasible. Third, each time a communication line is established within a telecommunication network, the specific path of the communication line likely employs different transmission facilities/trunks. Therefore, the problem may appear intermittently on calls between two locations and may require extensive testing to identify the source of the problems. Furthermore, this measurement technique can only be performed on the limited portion of the communication line between the two end-office switches which is generally not the cause of transmission problems. Therefore, the portion of the communication line that is frequently the source of transmission problems, the portion of the communication line between the end-office switch and the subscriber's telephone set, cannot be tested using this measurement technique.

Measurement techniques utilizing a device known as a transmission "test line" have been developed to evaluate portions of the communication line. The test line device is located at a switch. Typically, a maintenance technician would be sent to the subscriber's premises to remove the subscriber's telephone set and then to install the measurement device, which would make a connection to the test line. Measurements are then performed through the transmission of various test signals between the near-end (i.e., maintenance facility's end) test equipment and the far-end test line device. For example, the 100 test line is an industry-wide device used to test loss and noise on a connection.

The use of test line equipment, however, suffers several shortcomings. First, this testing is entirely intrusive and cannot be performed while the subscriber is on the line. Thus, the subscriber cannot provide the maintenance technician any simultaneous feedback during the course of measurements. Second, this testing requires sending a technician to the customer's location which is expensive.

Similar to test line equipment, U.S. Pat. No. 5,490,199 issued to Fuller et al., on Feb. 6, 1996, and assigned to AT&T Corp. discloses a system for monitoring and analyzing facsimile transmissions. Measurements are performed non-intrusively and in real time during the transmissions of facsimiles and thus require a facsimile machine connected at both ends of the connection. These measurements, however, cannot be performed on a connection between any devices other than facsimile machines. Thus, just like test line equipment, these measurements require the subscriber's telephone set to be removed from the communication line. Furthermore, because these measurements cannot be performed while the subscriber is talking on the line, the subscriber cannot provide the maintenance technician any simultaneous feedback.

SUMMARY OF THE INVENTION

The present invention improves upon current measurement techniques for communication systems by testing the communication line through to the subscriber's voice transceiver, e.g., the subscriber's telephone.

The present invention is to utilizes telephone transmissions present on the communication line during a regular telephone call without the use of special accessories at the subscriber's premise.

Also, the present invention allows measurements to be performed while the maintenance technician communicates with the caller. This allows the technician to correlate the subscriber's description of the connection characteristics with the specific network problem measured by the technician.

The interactive measurement method and system of the present invention diagnoses problems in a communication line between a technician and a subscriber having a voice transceiver, within a communication system. A call is initiated on the communication line. Transmission parameters are measured on the communication line by a signal processor. The measurements are performed on the communication line through to the subscriber's voice transceiver. The signal processor then evaluates the measured parameters to diagnose problems in the communication line.

DETAILED DESCRIPTION

Figure 1:
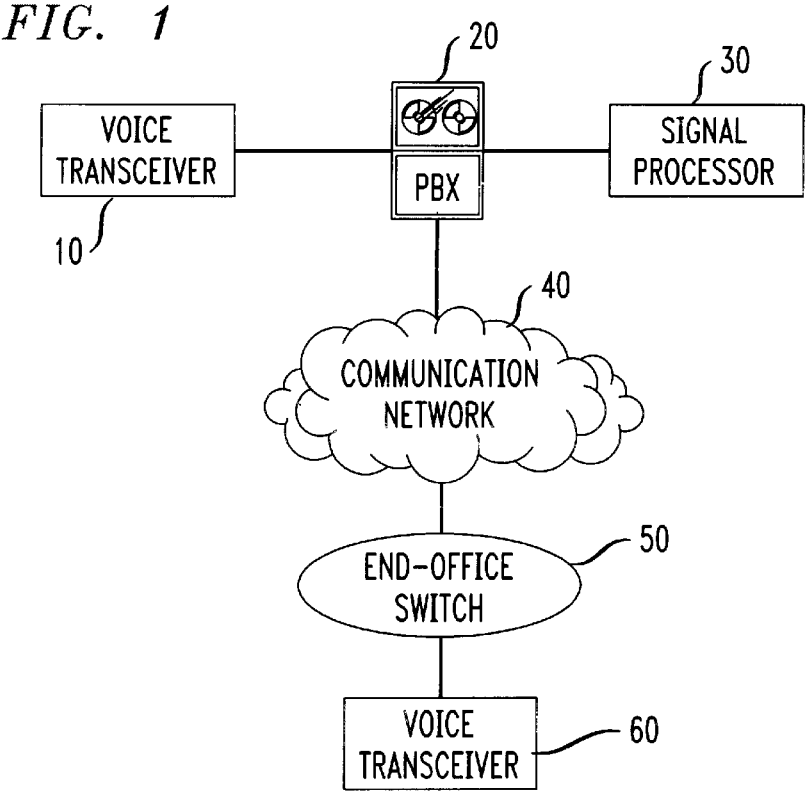
FIG. 1 shows a system block diagram of a system for diagnosing problems in a communication line in accordance with an embodiment of the present invention.

FIG. 1 illustrates an embodiment of the present invention. The invention includes a test set comprised of a voice transceiver 10 that may be of any variety of devices that include voice transmitting and receiving capabilities, such as a telephone, personal computer with microphone and speaker, etc. Voice transceiver 10 is connected to a private branch exchange (PBX) 20. For purposes of the following discussion, the technician is located at voice transceiver 10.

Figure 2:
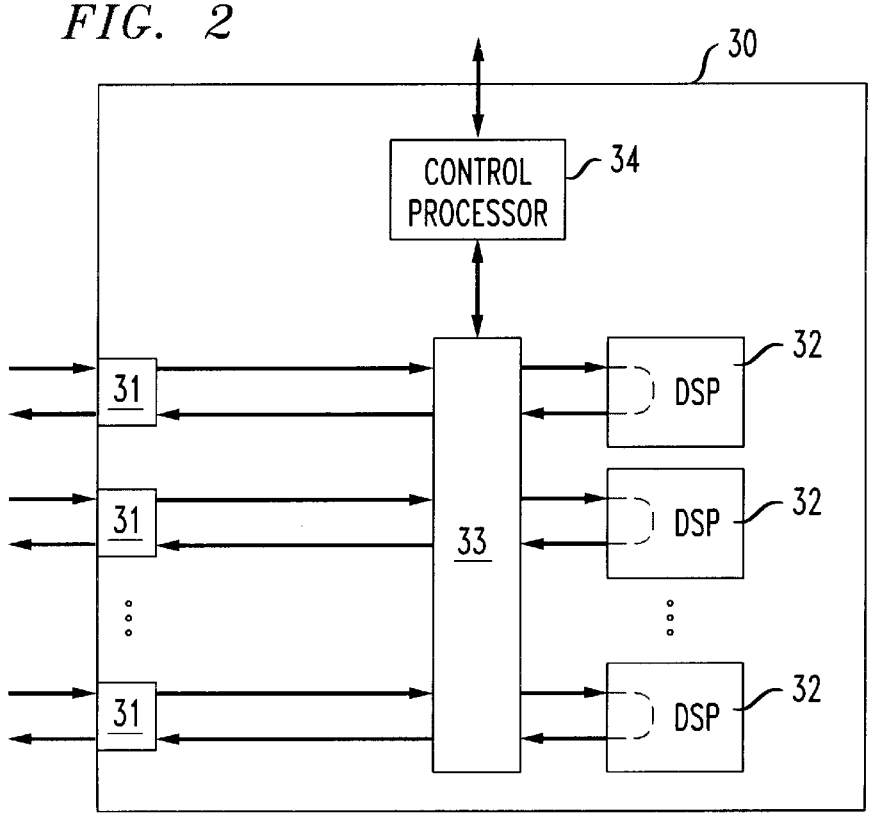
FIG. 2 shows a system block diagram of a signal processor in accordance with an embodiment of the present invention.

PBX 20 is connected to signal processor 30 which performs measurements on a communication line. FIG. 2 illustrates a possible configuration for signal processor 30. Each communication line from PBX 20 can be connected to signal processor 30 through T1 interface board 31. In a preferred embodiment, signal processor 30 includes several T1 interface boards. For each communication line from PBX 20 that can be connected to signal processor 30 through a T1 interface board 31, signal processor 30 includes a digital signal processor (DSP) 32. T1 interface board 31 and DSPs 32 are connected to data bus 33. Data bus 33 allows any of T1 interface boards 31 to be connected to any of DSPs 32. Control processor 34 is also connected to data bus 33. Control processor 34 allows technicians to interact with DSPs 32 and to select the specific measurements to be performed, as discussed below.

As configured in FIG. 2, the present invention allows measurements to be performed on multiple communication lines simultaneously. Multiple T1 interface boards 31 and DSPs 32 are not absolutely necessary, however, for the present invention to operate because voice transceiver 10, for example, could be directly connected to a signal processor 30.

It should be understood that various alternative configurations and components are possible. For example, signal processor 30 may comprise any alternative types of data bus 32 and interface board 31. Similarly, control processor 34 may be external from and connected to signal processor 30; for example, an external control processor could be a personal computer. Alternatively, multiple external control processors can be connected together through a local area network (LAN) to signal processor 30.

PBX 20 is also connected to external communication network 40. External communication network 40 may comprise private networks, public networks, or both. Communication network 40 is connected to end-office switch 50 which may comprise a PBX, a local exchange carrier (LEC), etc. End-office switch 50 is connected to voice transceiver 60. Voice transceiver 60 is any of a variety of devices that include voice transmitting and receiving capabilities, such as a telephone, personal computer with microphone and speaker, etc. For purposes of the following discussion, the subscriber is located at voice transceiver 60.

The measurement capabilities of the present invention are initiated at the start of a call between the subscriber and the technician. The call may originate from either the subscriber or the technician. The following discussion will first examine the case where the call originates from the technician.

By interfacing control processor 34, the technician first selects a channel within signal processor 30 to route the call. Alternatively, channel selection can be performed automatically by signal processor 30 once the technician initiates a measurement. The channel specifies which T1 interface board 31 and DSP 32 of signal processor 30 will be employed during the call. PBX 20 loops the call through the proper T1 interface board 31, to an available DSP 32, back through the selected T1 interface board 31 and back to PBX 20. The technician then dials the subscriber's phone number. At this point in the process, the technician can begin selecting one or more possible measurements to be performed by signal processor 30.

Some measurements can be performed before the subscriber answers the phone. For example, the audible ring level and the trunk noise level can be measured by signal processor 30. The trunk noise measurement is made during the periods between audible rings before the subscriber answers. A single threshold is used to discriminate between audible ringing and trunk noise. The samples of each are then averaged and compared to predetermined criteria. If the average audible ring level or the average trunk noise level fail to meet the predetermined criteria, then the trunk circuits within communication network 40 leading up to end-office switch 50 are the source of the problem, and the subscriber's loop or voice transceiver 60 are not the source of the problem. If the average audible ring level or the average trunk noise level meet the predetermined criteria, then further measurements must be performed to diagnose the source of the problem.

After the subscriber answers, the subscriber's voice and interactions can provide a source of signals for further measurements. For example, the speech levels, and background and circuit noise levels can be measured by signal processor 30. Speech levels are measured by evaluating the volume of the subscriber's voice; background noise levels are measured during the periods between the subscriber's spoken words. A single threshold is used to discriminate between speech and background noise. The samples of each are then averaged and compared to predetermined criteria. This measurement calculation is described in U.S. Pat. No. 5,216,702 issued to Ramsden on Jun. 1, 1993 and assigned to AT&T Bell Laboratories, and is herein incorporated by reference. If, after passing the preceding tests, the average speech level or the average background noise level fail to meet the predetermined criteria, then the subscriber's loop or voice transceiver 60 are potential sources of the problem.

The technician's voice can also be used as a test signal to determine whether the echo cancelers are working if the call is routed, within communication network 40, over intertoll trunks. The technician's voice is transmitted over the communication line to the far-end where the subscriber is located and reflected back to the near-end of the communication line where the technician is located. Signal processor 30 utilizes an adaptive filtering routine to determine whether the echo has been canceled. These measurement calculations are described in U.S. Pat. No. 4,947,425 issued to Grizmala et al., on Aug. 7, 1990 and assigned to AT&T Bell Laboratories, and are herein incorporated by reference. If echo related to the technician's voice has been canceled, then the echo cancelers with communication network 40 can be eliminated as the source of the problem.

Next, the loop noise can be measured by muting the background noise at the subscriber's premises by simulating a quiet termination at voice transceiver 60. The subscriber either covers the mouthpiece of the telephone set or utilizes a mute feature if available, for approximately ten seconds. Signal processor 30 then measures and averages the noise levels. If, after passing the preceding tests, the average loop noise level fails to meet the predetermined criteria, then background noise at the subscriber's premises can be eliminated as the source of the problem and the subscriber's loop is the source of the problem.

Next, sources of intermittent echo and constant echo can be investigated. For example, echo path loss, echo path delay, echo return loss, and high and low singing return loss can be measured. Just like the loop noise test, the subscriber either covers the mouthpiece of voice receiver 60 or utilizes a mute feature if available, for approximately ten seconds. Then, signal processor 30 disables echo cancelers located within communication network 40 by transmitting the standard disabling tone, as is well known. Signal processor 30 transmits two seconds of random noise while collecting samples from the receive direction. Signal processor 30 then utilizes an adaptive filtering routine to calculate the echo power and to determine path delay. These measurement calculations are described in U.S. Pat. No. 4,947,425 issued to Grizmala et al., on Aug. 7, 1990 and assigned to AT&T Bell Laboratories, and are herein incorporated by reference. If, after passing the preceding tests, the echo and delay levels fail to meet the predetermined criteria, then the return loss characteristics of the subscriber's connection may be the source of the problem.

Because the subscriber mutes or muffles the telephone set for the loop noise measurement and the echo and delay measurements, both measurements can be initiated by the technician and performed by signal processor 30 simultaneously for convenience.

Subscriber interaction can also be utilized to perform other measurements. For example, the average touch-tone level can be measured to estimate loop loss by calculating the average power of the transmitted digits. To emulate a far-end responder's test signal, the technician directs the subscriber to send touch-tone digits during the call. Each touch-tone digit should be pressed one at a time for about one or two seconds. Signal processor 30 then measures the level of the transmitted tone. A single threshold is used to discriminate touch-tone digits and background noise. Noise samples are discarded; samples of the touch-tone digits are averaged and compared to predetermined criteria. If, after passing the preceding tests, the average touch-tone level fails to meet the predetermined criteria, then the subscriber's loop or voice transceiver 60 may be the source of the problem.

The measurement techniques discussed above regarding a technician-originating call would be the same for a call originating from the subscriber, except for measurements initiated before the subscriber answers, such as the audible ring level or trunk noise level measurements. These measurements can only be performed on a call initiated by the technician after the subscriber-initiated call is terminated.

It should, of course, be understood that while the present invention has been described in reference to the measurement of particular transmission parameters, the measurement of other transmission parameters should be apparent to those of ordinary skill in the art. For example, the calculations performed by signal processor 30 could be modified to measure other transmission parameters. Likewise, the subscriber could be directed to interact during the course of a measurement in manners other than those described herein.

What is claimed is:

1. A method for diagnosing problems in a communication line between a technician and a subscriber having a voice transceiver, within a communication system, comprising the steps of:
   (a) initiating a call on the communication line between the technician and the subscriber;
   (b) measuring, quantitatively, parameters of transmissions on the communication line through to the subscriber's voice transceiver while the call is in progress, the measured parameters include at least one of:
      (i) a signal level of the subscriber's voice;
      (ii) a noise level in the communication line during silence between the subscriber's voice;
      (iii) a first echo level in the communication line by using the technician's voice as a test signal;
      (iv) a loop noise level in the communication line while the subscriber mutes background noise at subscriber's premise;
      (v) a second echo level in the communication line while the subscriber mutes background noise at subscriber's premise; and
      (vi) a loop loss level in the communication line based on dual tone multi-frequency (DTMF) digits selected by the subscriber; and
   (c) evaluating the measured parameters to diagnose problems in the communication line.

2. An apparatus for diagnosing problems in a communication line between a technician and a subscriber having a voice transceiver, within a communication system, comprising:
   a signal processor connected within the communication line between the technician and the subscriber, said signal processor quantitatively measures parameters of transmissions on the communication line through to the subscriber's voice transceiver while a call between the technician and the subscriber is in progress, said signal processor evaluates the measured parameters to diagnose problems in the communication line; and
   a private branch exchange (PBX) connected to said signal processor, said PBX routes a call from the technician to said signal processor.

3. The apparatus of claim 2, further comprising:
   a control processor connected to said signal processor, the technician controls said signal processor through said control processor.

4. The apparatus of claim 2, further comprising:
   an interface board connecting said signal processor and said private branch exchange.

5. The apparatus of claim 4, further comprising:
   a data bus connecting said interface board and said signal processor.

6. The apparatus of claim 5, wherein control processor is connected to said data bus.

7. A method for diagnosing problems in a communication line between a technician and a subscriber having a voice transceiver, within a communication system, comprising the steps of:
   (a) initiating a call on the communication line between the technician and the subscriber;
   (b) measuring, quantitatively, parameters of transmissions on the communication line through to the subscriber's voice transceiver while the call is in progress; and
   (c) evaluating the quantitatively measured parameters to diagnose problems in the communication line.

8. The method of claim 7, wherein:
   the parameters of transmission measured quantitatively in said measuring step (b) includes an average trunk noise level and an average audible ring level of the call before the subscriber goes off-hook;
   said evaluating step (c) including identifying, when the average trunk noise level and the average audible ring level do not satisfy a first predetermined criteria, the problems as being located in trunk circuits within the communication line leading up to an end-office switch.

9. The method of claim 8, wherein:
   the parameters of transmission measured quantitatively in said measuring step (b) includes an average speech level and an average background noise level of the call;
   said evaluating step (c) including identifying, when:
      (i) when the average trunk noise level and the average audible ring level satisfy the first predetermined criteria, and
      (ii) the average speech level and the average background noise level do not satisfy a second predetermined criteria,
   the problems as being located in subscriber loop or the voice transceiver within the communication line.

10. The method of claim 9, wherein:

the parameters of transmission measured quantitatively in said measuring step (b) includes an loop noise level of the call while the subscriber mutes background noise;

said evaluating step (c) including identifying, when;
- (i) when the average trunk noise level and the average audible ring level satisfy the first predetermined criteria,
- (ii) the average speech level and the average background noise level satisfy the second predetermined criteria, and
- (iii) the loop noise level does not satisfy a third predetermined criteria, the problems as being located in subscriber loop within the communication line.

11. The method of claim 10, wherein:

the parameters of transmission measured quantitatively in said measuring step (b) includes an echo level and a delay level of the call while the subscriber mutes background noise;

said evaluating step (c) including identifying when:
- (i) when the average trunk noise level and the average audible ring level satisfy the first predetermined criteria,
- (ii) the average speech level and the average background noise level satisfy the second predetermined criteria,
- (iii) the loop noise level satisfies the third predetermined criteria, and
- (iv) the echo level and the delay level does not satisfy a fourth predetermined criteria;

the problems as being located in the return loss characteristics of the subscriber's connection within the communication line.

12. The method of claim 11, wherein:

the parameters of transmission measured quantitatively in said measuring step (b) includes an echo level and a delay level of the call while the subscriber mutes background noise;

said evaluating step (c) including identifying, when:
- (i) when the average trunk noise level and the average audible ring level satisfy the first predetermined criteria,
- (ii) the average speech level and the average background noise level satisfy the second predetermined criteria,
- (iii) the loop noise level satisfies the third predetermined criteria,
- (iv) the echo level and the delay level satisfy the fourth predetermined criteria; and
- (v) the average touch-tone level fails does not satisfy a fifth predetermined criteria;

the problems as being located in the subscriber loop or the voice transceiver within the communication line.

13. The method of claim 7, wherein said measuring step (b) measures a signal level of an audible ring of the communication line before the subscriber answers.

14. The method of claim 7, wherein said measuring step (b) measures a trunk noise level in the communication line between audible rings before call answer by the subscriber.

15. The method of claim 7, wherein said measuring step (b) measures a signal level of transmissions of voice.

16. The method of claim 7, wherein said measuring step (b) measures a noise level in the communication line during silence between transmissions of voice.

17. The method of claim 7, wherein said measuring step (b) measures an echo level in the communication line by using voice of the technician as a test signal.

18. The method of claim 7, wherein said measuring step (b) measures a loop noise level in the communication line while the subscriber mutes background noise.

19. The method of claim 7, wherein said measuring step (b) measures an echo level in the communication line while the subscriber mutes background noise.

20. The method of claim 18, wherein the subscriber, at the direction of the technician, mutes background noise by covering a mouthpiece of the voice transceiver.

21. The method of claim 20, wherein the subscriber, at the direction of the technician, mutes background noise by covering a mouthpiece of the voice transceiver.

22. The method of claim 18, wherein the subscriber, at the direction of the technician, mutes background noise by selecting a mute feature of the voice transceiver.

23. The method of claim 20, wherein the subscriber, at the direction of the technician, mutes background noise by selecting a mute feature of the voice transceiver.

24. The method of claim 7, wherein said measuring step (b) measures loop loss in the communication line based on dual tone multi-frequency (DTMF) digits selected by the subscriber.

* * * * *